United States Patent [19]

Naylor et al.

[11] Patent Number: 4,546,470
[45] Date of Patent: Oct. 8, 1985

[54] COMMUNICATIONS SYSTEMS

[75] Inventors: Michael Naylor, Reading; Robert Latham, Camberley, both of England

[73] Assignee: Racal-SES Limited, Bracknell, England

[21] Appl. No.: 556,916

[22] Filed: Dec. 1, 1983

[30] Foreign Application Priority Data

Dec. 8, 1982 [GB] United Kingdom ............... 82 34992

[51] Int. Cl.[4] .......................... H04J 3/00; H04J 1/10; H04J 3/08; H04Q 11/04
[52] U.S. Cl. ........................ 370/97; 370/58; 370/55
[58] Field of Search .............. 320/97, 58, 66, 55; 455/17, 18

[56] References Cited

U.S. PATENT DOCUMENTS

| 3,637,941 | 1/1972 | Rekiere | 370/58 |
| 3,760,103 | 9/1973 | Condon | 370/58 |
| 3,823,401 | 7/1974 | Berg et al. | 370/55 |
| 4,020,290 | 4/1977 | Perna et al. | 370/58 |

FOREIGN PATENT DOCUMENTS 0045066 2/1982 European Pat. Off. .

Primary Examiner—Douglas W. Olms
Assistant Examiner—Wellington Chin
Attorney, Agent, or Firm—Leydig, Voit & Mayer, Ltd.

[57] ABSTRACT

A device for use in an intermediate station of a radio-relay communications system comprises a package consisting of a trunk switch, a multiplexer, and a demultiplexer. The switch (48) has three TDM inputs, one of which is connected to the output of the multiplexer, and three TDM outputs one of which is connected to the input of the demultiplexer. The switch is non-blocking and is adapted to switch any input TDM channel to any selected output TDM channel, to enable, for example, a signal received in an incoming channel from an adjacent radio station to be selectively retransmitted to radio station or directed to one of the user terminals at the radio station.

5 Claims, 4 Drawing Figures

COMMUNICATIONS SYSTEMS

BACKGROUND OF THE INVENTION

1. Technical Field

The present invention relates to communication systems employing time division multiplexing (TDM).

The invention is more particulary concerned with radio-relay communications systems wherein messages are transmitted to their destination via at least one intermediate radio station.

2. Prior Art

Previously proposed radio-relay systems employing time division multiplexing have employed a number of radio stations each with a radio receiver and transmitter, a multiplexer and demultiplexer for communication with each other station. Thus an intermediate radio-relay station which has to communicate with two other stations has two transmitters, receivers etc., one set for each station with which it can communicate. Each user who is connected to a station has a terminal which is connected to an input port of a transmitter multiplexer and a port of the corresponding receiver demultiplexer. The terminals may be connected via land lines or preferably via radio links. The radio transmitters of a radio station each transmit a time division multiplexed signal which may include, for example, 30 channels from 30 different user terminals. If the radio station is an intermediate radio-relay station, signals in at least some of the channels will normally need to be re-transmitted. Therefore output ports of the receiver demultiplexer corresponding to such channels are each connected to a port of the other transmitter multiplexer. Any user terminals connected to such an intermediate radio-relay station will be connected to the remaining ports of either receiver demultiplexer and corresponding transmitter multiplexer.

In such a radio-relay communication system, it is necessary to provide a pair of multiplexers and demultiplexers at each intermediate station.

SUMMARY OF THE INVENTION

Accordingly, the present invention provides a device for use in an intermediate relay station of a digital, time division multiplexed (TDM) communications system, said device including switch means having a plurality of inputs and outputs carrying multi-channel TDM signals, each signal including a series of frames each of which contains at least one bit of a signal to be transmitted in each channel, a multiplexer connected to one of said inputs, a demultiplexer connected to one of said outputs, ports of the multiplexer and demultiplexer being for connection to a plurality of user terminals, said switch means including a traffic memory having an input, means connected to all of said inputs for receiving and storing in said traffic memory each frame of the input TDM signals, the input to said traffic memory being capable of operating at a rate greater than the expected total rate of arrival of bits at all the inputs so as to buffer clock variations in the inputs, means for reading out selected bits from said traffic memory to each output to create output TDM signals such that each output channel corresponds to a single input channel, and programmable control means for determining the path of each channel through the device.

Since the input to the traffic memory can operate faster than theoretically required the switch means does not require a buffer memory to be connected to each input to temporarily store the received frames in order to compensate for variations in the clock rates of the different inputs. The memory is capable of accepting data at a rate higher than that theoretically required to take account of such timing variations and provide sufficient spare time slots to allow data to be read into the memory directly it is received.

In another embodiment which is particularly suitable for convenient expansion of the number of inputs, outputs and user terminals it is able to accommodate, the switch means comprises a pluarlity of separate circuit means each having one said input and one said output, said circuit means being interconnected for the exchange of signal bits and operating under the control of said programmable control means.

The invention further provides a radio-relay system for communicating via multi-channel TDM signals, comprising a plurality of radio stations which are each in communication with at least two other stations and each have a number of user terminals connectable thereto for reception and transmission of signals in respective allocated signal channels processed by that station, each station comprising a respective radio receiver for receiving an incoming TDM signal from each of said other stations, a respective radio transmitter for transmitting a TDM signal to each of said other stations, a TDM switch having a plurality of inputs and outputs, an input being connected to each said receiver and an output being connected to each said transmitter, a multiplexer having a plurality of input ports for connection to user terminals and an output connected to one of the inputs of said TDM switch, and a demultiplexer having a plurality of output ports for connection to user terminals and an input connected to one of said outputs of said TDM switch, said TDM switch being operative to selectively distribute predetermined channels of the input TDM signals to predetermined channels in the output TDM signals.

DESCRIPTION OF PREFERRED EMBODIMENTS

Figure 1:
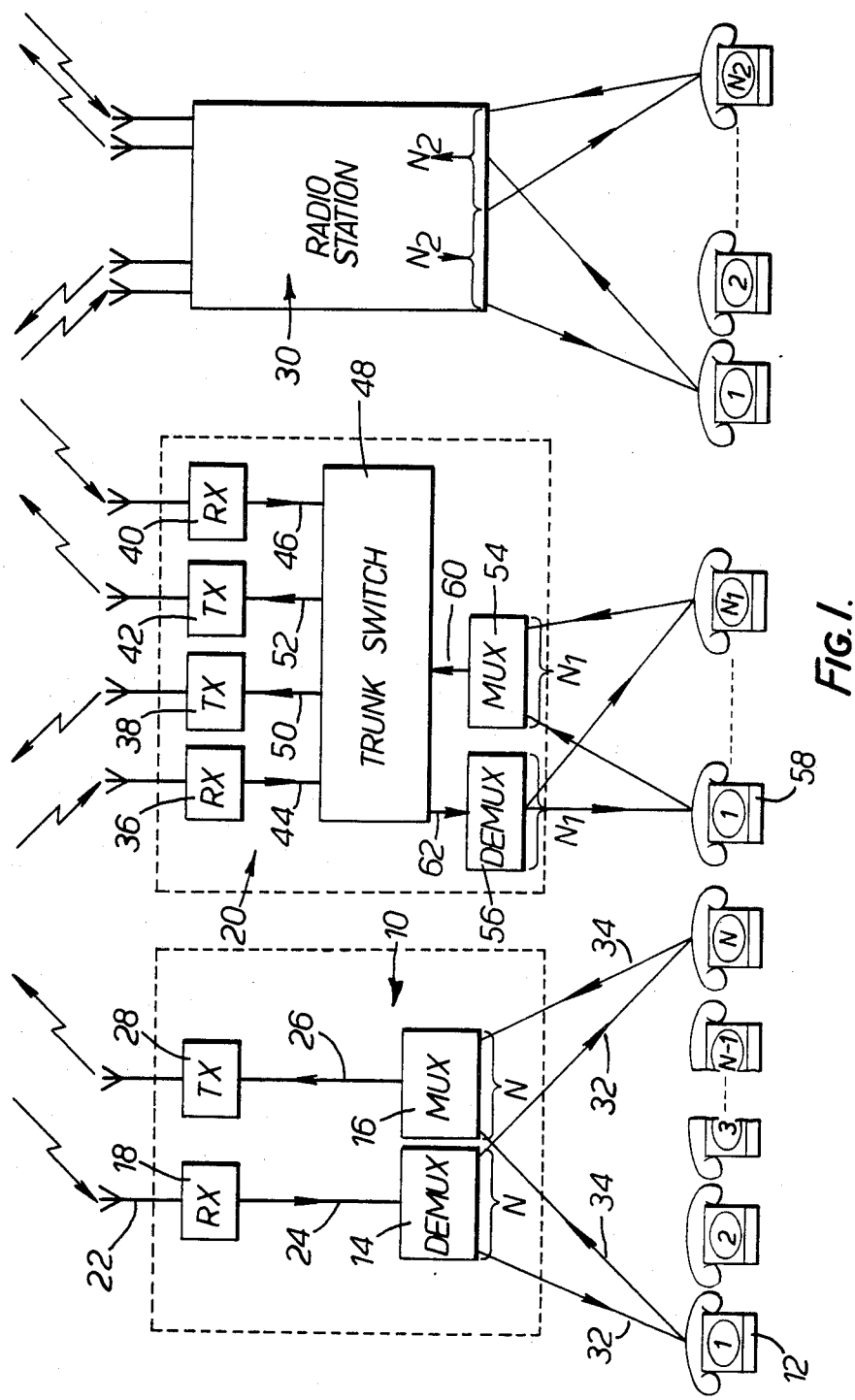
FIG. 1 is a representation of a radio-relay communications system.

A radio-relay communications system as illustrated in FIG. 1 is made up of a number of radio stations 10,20,30 connected via radio links. The station 10 is an initiating station and is connected via a radio link to only one other station 20, whereas the station 20 is an intermediate radio-relay station connected via radio links to both stations 10 and 30. Alternatively, the radio stations may be arranged in a circular configuration with every station located between two other radio stations with which it is in radio contact. Additionally each radio station may be in contact with more than two radio stations.

The radio station 10 has a similar construction to stations previously proposed for use in radio-relay communications systems.

Each user connected to the radio station 10 has a terminal 12. N terminals are illustrated designated by the numbers 1–N. Typically an initiating radio station may be capable of supporting 30 users. Each terminal is connected to a respective output port of a receiver demultiplexer 14 and a respective input port of a transmitter multiplexer 16. A radio receiver 18 is connected to an aerial 22 and receives a 30 channel TDM signal which has been transmitted from the adjacent radio station 20. As well as the frames of the TDM signal each including at least one bit from each channel, clock and synchronisation signals are included or can be generated from the TDM signal. The incoming TDM signal is demodulated and fed to demultiplexer 14 via line 24.

The input signals from each of the user terminals to the input ports of multiplexers 16 are combined into a single, 30 channel time division mutliplexed output signal along a line 26 to radio transmitter 28, which modulates the signal and transmits it to the next adjacent radio relay station 20.

The radio receivers and transmitters may be of any suitable type and it is not necessary that each radio link between two radio stations be of the same type or operate at the same carrier frequency.

Each of the user terminals 12 may consist of a telephone set which is connected to its associated output port of the receiver demultiplexer 14 by a land line 32 and to its associated input port of multiplexer 16 by another land line 43. Alternatively, the terminal 12 may consist of a radio which is adapted to tranmit signals to and receive signals from its associated ports of the multiplexer and demultiplexer respectively. In this case, the output ports of the demultiplexer must be provided with appropriate radio transmitters and the input ports of the multiplexer 16 provided with appropriate radio receivers. If there is a large demand from users there may be more user terminals than there are multiplexer ports. In this case a concentrator is provided to connect a user terminal wishing to use the communications system with a free pair of input and output ports if available.

The intermediate radio-relay station 20 is generally similar to radio station 10, however it is provided with a radio receiver 36 and a radio transmitter 38 for communicating with radio station 10, and a further receiver 40 and transmitter 42 for communicating with radio station 30. The receivers 36,40 are adapted to receive their respective incoming time division multiplexed signal and after demodulation pass them along lines 44 and 46 to a trunk switch 48, which is illustrated in more detail in FIG. 2. The outputs from switch 48 are each in the form of a 30 channel time division multiplexed signal. One output from the switch 48 is fed along line 50 to transmitter 38, and another output is fed along line 52 to transmitter 42.

The radio station 20 also includes a multiplexer 54 and a demultiplexer 56, the ports of which enable a further $N_1$ user terminals 58 to be connected into the system. The user terminals are connected in th same way as described in relation to user terminal 12 at radio station 10. The multiplexer has a TDM output which is connected via line 60 as a further TDM input of the trunk switch 48. The demultiplexer 56 is connected via line 62 to a further TDM output of the switch 48. The trunk switch 48 and the multiplexer 54 and demultiplexer 56, although illustrated separately in the drawings for purposes of clarity, may be packaged as a single device and may be fabricated as a single integrated circuit or set of integrated circuits. The outputs from the device will therefore consist of the lines 44, 46, 50 and 52 for TDM signals, and the $N_1$ output and input lines, each for transmitting or receiving a single channel signal to or from a user terminal 58.

The function of the trunk switch 48 is to sort the channels of the two TDM signals being received from the radio stations 10 and 30 and the channels of the TDM output of the multiplexer 60, which is made up of the transmissions of the local user terminals 58, into three TDM outputs along lines 50, 52 and 62. The input channels can be redistributed amongst the available output channels in any required manner. For example, some of the channels from the user terminals will require to be connected with radio station 10, whilst others will wish to be connected to radio station 30. Thus each frame of the TDM signal received by the switch along line 60 will be divided up so that some channels enter frames of the TDM signal to be output along line 50 for subsequent transmission to radio staton 10, whilst the remainder enter frames of the signal output along line 52. It would also be possible to permit the user terminals local to station 20 to communicate with one another by directing the appropriate input channels into frames of the signal being fed out along line 62 to the demultiplexer 56.

The radio station 30 may have the same construction as radio station 20 as illustrated and provide facilities for the connection of a further $N_2$ users to the system.

The TDM signals used throughout the system each consist of a sequence of similar frames. Each frame includes certain synchronisation and framing signals and may have any of the currently available TDM formats. The specific type of TDM framing format adopted is immaterial provided that it is compatible with all the multiplexing equipment used throughout the system. Each frame includes a bit or character derived from signals to be transmitted in each of the channels. Thus a signal transmitted in one of the channels provides a bit or character in the same position in each frame.

Figure 2:
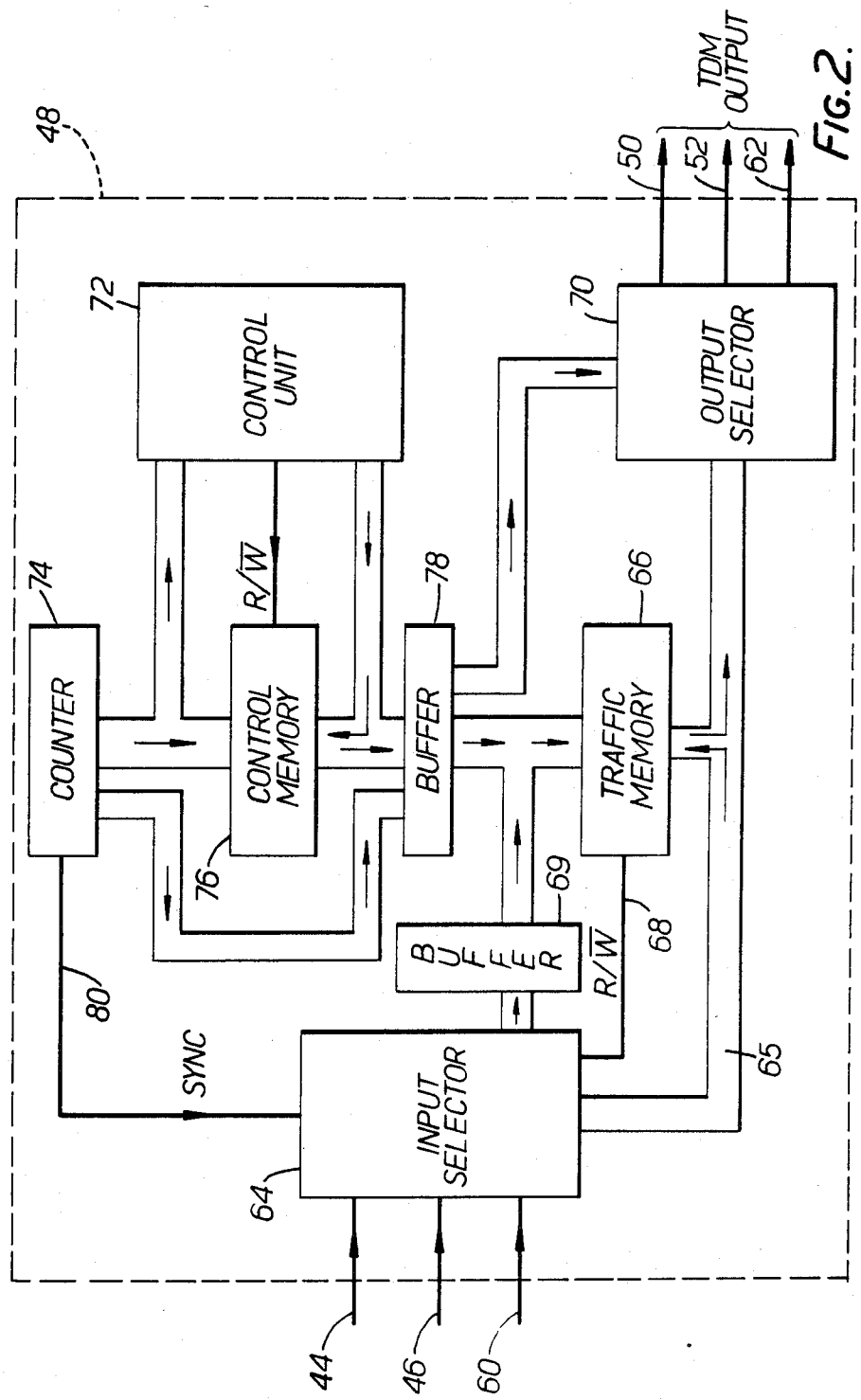
FIG. 2 is a block diagram of a TDM switch for use in an intermediate relay station of the communications system illustrated in FIG. 1.

The device 48 will now be described in more detail with reference to FIG. 2.

The device 48 has three input lines 44,46 and 60 each containing a multi-channel TDM signal which is fed to an input selector 64. The input selector is connected via a data bus 65 to a traffic memory 66 which is a semiconductor RAM. The input selector includes an address counter for each input to keep track of the channel to which each incoming bit in each input relates. The address information derived from the address counter and relating to the data being fed to traffic memory 66 is fed via a buffer 69 to the memory 66 to identify where each bit is to be stored in the traffic memory in dependence on which channel it relates to. The input selector 64 feeds data onto the data bus directly it is received on the inputs and signals to the memory 66 when data is being fed to it by means of a read/write line 68. The data bus carries data in parallel form and the input selector incorporates a serial to parallel shift register. The data bus between the input selector and the traffic memory has a greater capacity than that in principle required for the number of TDM inputs. For example if the data bus is an eight bit parallel bus and transmits data at the same bit rate as bits are received at each of the three TDM inputs, there is capacity for an additional five bits relative to each received signal time slot. However, the timing of some of the input TDM signals may be temporarily running faster than normal and therefore because of this additional capacity it is possible to transmit data direct to the traffic memory without buffering the individual inputs. With an eight bit parallel bus it is possible to accommodate up to six TDM inputs although only three are shown.

The memory is connected via the data bus to an output selector 70 which has three output lines 50, 52 and 62 for TDM signals. A control unit 72 contains the main control program and information relating to the currently required passage of each channel through the switch. The control unit 72 supplies information on a further section of the data bus to a a control memory 76 and to an output address buffer 78. A counter 74 sequences through the information stored in the control memory 76 to cause it to be fed out on further sections of the data bus to the buffer 78. The output of the counter is also fed direct to buffer 78. The buffer 78 combines the direct counter input and the control memory input to produce an output which is an address and which is fed to the traffic memory 66 and to the output selector 70 to indicate which stored bits are to be output from the memory 66 and to which output line they are to be fed. A synchronisation signal is also fed from counter 74 to the input selector 64 along line 80.

The operation of the switch 48 will now be described.

Several bits of each TDM input are written simultaneously to the traffic memory 66 and temporarily stored therein. The timing with which bits are fed into the data bus is determined by the counter 74. The groups of bits fed to the traffic memory are written into locations in the traffic memory 66 determined by the address data received from buffer 69 which indentifies the channel to which they belong so that all bits relating to a single channel may for example be stored in consecutive locations. The bits are then read out along the data bus, a group at a time in parallel, in a predetermined sequence determined by the address fed to the traffic memory 66 from the buffer 78, to the output selector 70.

At the output selector 70 the received bits are rearranged into frames, under the control of the address data from buffer 78 which is also fed to the output selector 70, to create TDM output signals along output lines 50, 52 and 62.

The control unit 72 determines the information fed to the control memory 76 and from the control memory 76 to buffer 78 and is programmable to enable the path of a channel through the switch to be varied.

Although the switch has been described as having three TDM inputs and three outputs, it is also possible for the number of inputs to be greater than the number of outputs. Therefore several switches can be used in parallel. Clearly it is not necessary for the number of channels in each input and output TDM signal to be the same. It will be appreciated that the switch 48 is non-blocking.

A further embodiment of the TDM switch 48 will now be described with reference to FIGS. 3 and 4 of the drawings. This embodiment of the TDM switch 48 has a distributed structure with a separate circuit means in the form of a switch module 90 for each input and output. Therefore to accommodate the three inputs and three outputs of the FIG. 2 embodiment of the switch three separate switch modules are required. However, it is possible to use more or less switch modules up to the capacity of the data bus employed in dependence upon the number of inputs required to the intermediate station.

Figure 3:
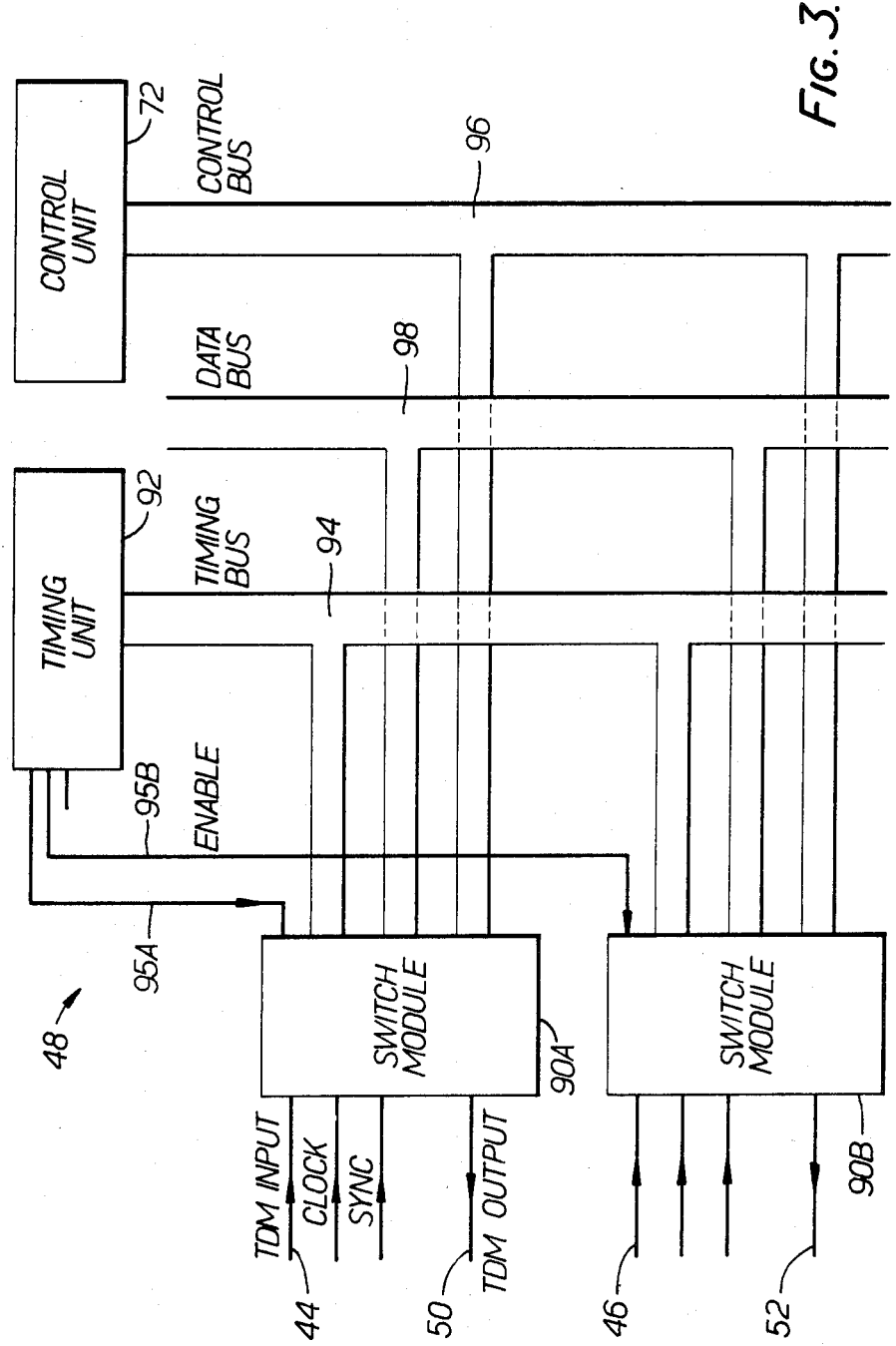
FIG. 3 is a block diagram of an alternative design of a TDM switch.

As illustrated in FIG. 3 the TDM switch 48 comprises a switch module 90A, 90B for each pair of input and output lines, and a common timing unit 92 which fulfills a similar function to the counter 74 of the previous embodiment. A common control unit 72 is also provided. The timing unit 92 is connected to each switch module via a common timing bus 94 and also via a respective enable line 95A,95B to each switch module. A common control bus 96 connects the control unit 72 to each of the switch modules. A data bus 98 is also provided for exchanging data between the various switch modules.

In the switch illustrated in FIG. 3 the switch module 90A is shown as being connected to TDM input 44 and to TDM output 50. Switch module 90B is connected to TDM input 46 and output 52. A further switch module 90C will be connected to input 60 and output 62 in order to provide a switch capable of fulfilling the switching function required by the intermediate radio relay station 20 of FIG. 1. Further switch modules can be readily provided at any time without modification to the circuitry, in order to allow for further inputs from different radio stations and similarly for further output. Each new switch module is simply connected to the timing, data and control buses and appropriate instructions provided to the control unit. It should also be noted that whereas each switch module has a respective TDM input and output there is no direct interconnection between these so that all the channels received by a switch module on its TDM input may be distributed to outputs connected to other switch modules or some of the channels may be connected to the output connected to that switch module.

Figure 4:
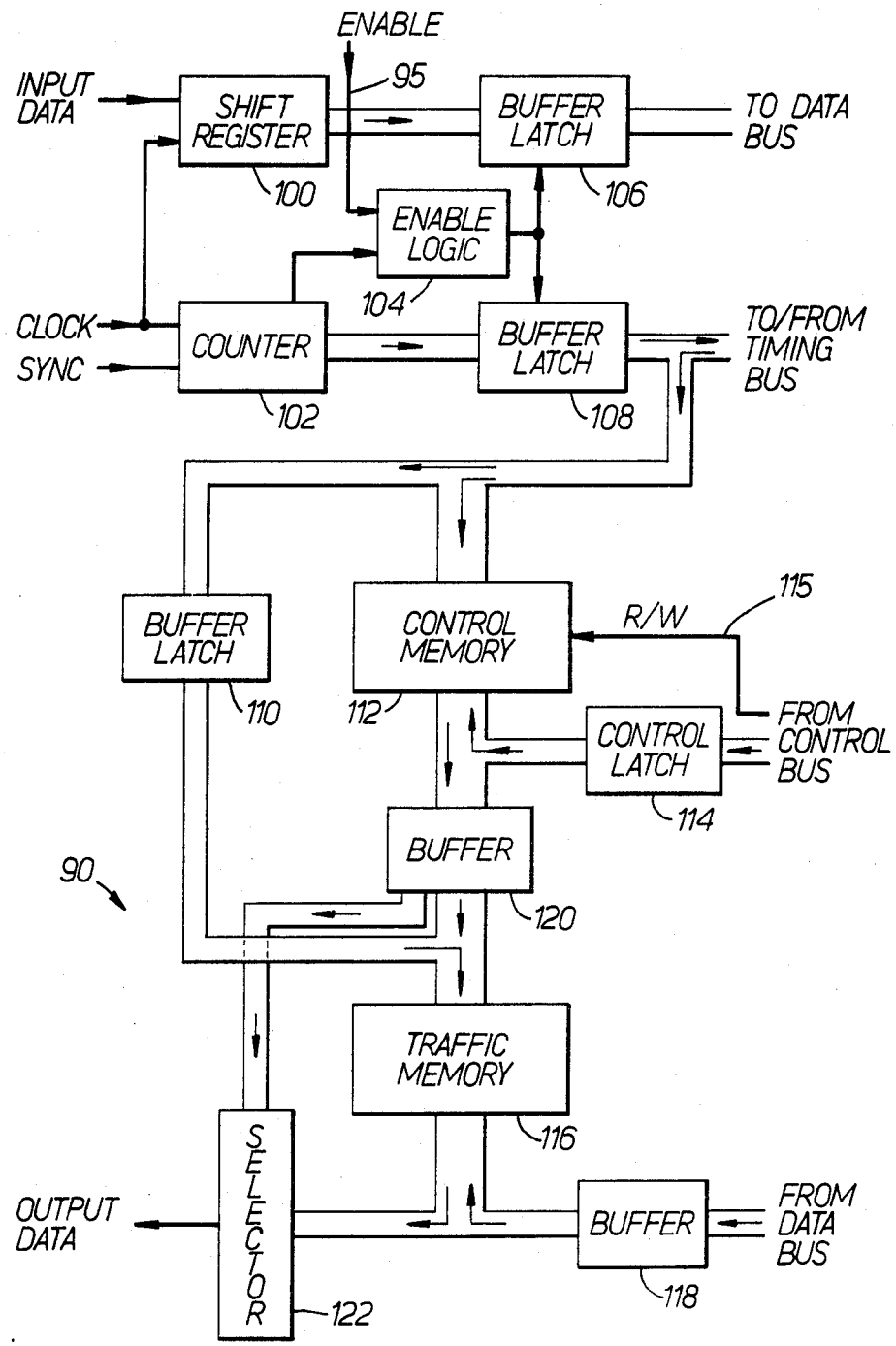
FIG. 4 is a block diagram of a switch module for use in the switch of FIG. 3.

The structure of each switch module is similar and is shown in more detail in FIG. 4. Each switch module has a TDM input, a clock input and a synchronisation input. The clock and sync inputs may be derived from the incoming TDM signal. A shift register 100 connected to the TDM input and to the clock input. A counter 102 is connected both to the clock and sync inputs of the switch module and controls one input of enable logic circuit 104 which has the enable line 95 as a further input from the common timing unit 92. The shift register acts as a serial to parallel convertor and is connected to a tristate buffer latch 106 and thence to the common data bus 98 under the control of the enable logic circuit 104. The counter 102 counts each input clock and every n th clock input, where n is the width of the data bus, the counter 102 produces an enable output on the input to the enable logic circuit 104 causing the buffer latch 106 and a further buffer latch 108 connected to the counter output to be enabled. The buffer latch 108 feeds information to the common timing bus 94.

The switch module also includes another buffer latch 110 which receives an input from the timing bus 94. The timing bus 94 is also connected to a control memory 112. Data is fed from the control unit 72 via the control bus 96 into the control memory 112 via a control latch 114. A read/write line 115 signals to the control memory when data is being sent to it. In this way the control memory 112 is loaded with information concerning the addresses of the data to be fed out on the output from that switch module. Each switch module also includes a traffic memory 116. This traffic memory is connected via a buffer 118 to the data bus 98. The traffic memory is also connected to the control memory 112 via an address buffer 120 which fulfills a similar function to the buffer 78 in the switch module of FIG. 2. Similarly the buffer 120 is connected to the output selector 112 which is in turn connected to the output line of the switch module. The buffer latch 110 also supplies part of the required address data direct to traffic memory 116 from the timing bus 94.

The distributive switch means described above operates as follows:

Each input is fed to a respective shift register 100 of its associated switch module 90A, 90B. The buffer latch 106 connected to the shift register accumulates a number of bits equal to the width of the data bus. When the buffer latches 106 and 108 are enabled by enable logic circuit 104, which is operated under control of the counter 102 and an enable signal from the timing unit 92, they feed data to the data bus 98 and the timing bus 94 respectively. During the above described input cycle, data is also read from the data bus 98 via the buffer 118 into the traffic memory 116. This same data is also written into the traffic memories of all the other switch modules. Thus, the traffic memory 66 of the switch described with reference to FIG. 2 is reproduced in each switch module.

During an output cycle of the switch module, which occur alternately with input cycles, the timing bus 94 operates under control of the timing unit 92 and controls the outputs of control memory 112 and buffer latch 110. Under the influence of the timing bus, an address is selected in the control memory 112 and the contents of that address location appear on the bus interconnecting the control memory 112 with the buffer 120. This input to the buffer 120 acts as a number of addresses for the traffic memory 116 and also for the output selector 122. A portion of the addresses required for the traffic memory 116 is derived from the timing bus directly via buffer latch 110. The contents of the traffic memory at the indicated addresses are then fed along the parallel bus to the output selector 120 to be arranged into a TDM signal on the output from the switch module. The input and output cycles are repeated continuously.

The particular data fed along the output is selected in dependence upon the contents of the control memory which are in turn determined by the control unit via the control bus and control latch 114. Thus the control unit provides the necessary inputs to the control memories of the respective switch modules in order to determine a new path for a particular input channel through the switch.

We claim:

1. A device for use in an intermediate relay station of a digital, time division multiplexed (TDM) communications system, said device comprising switch means having a plurality of inputs and outputs carrying multichannel TDM signals, each signal comprising a series of frames each of which contains at least one bit of a signal to be transmitted in each channel, a multiplexer connected to one of said inputs, a demultiplexer connected to one of said outputs, ports of the multiplexer and demultiplexer being for connection to a plurality of user terminals, said switch means including a traffic memory having an input, means connected to all of said inputs for receiving and storing in said traffic memory each frame of the input TDM signals, the input to said traffic memory being capable of operating at a rate greater than the expected total rate of arrival of bits at all the inputs so as to buffer clock variations in the inputs means for reading out selected bits from said traffic memory to each output to create output TDM signals such that each output channel corresponds to a single input channel, and programmable control means for determining the path of each channel through the device.

2. A device as claimed in claim 1, wherein said switch means includes only one said traffic memory, and said reading out means reads out a plurality of bits at a time in a predetermined sequence to selected ones of said outputs to create said output TDM signals.

3. A device as claimed in claim 1, wherein said switch means includes a plurality of separate circuit means each having one said input and one said output associated therewith, said traffic memory including an individual traffic memory in each said circuit means, and said receiving and storing means storing each frame of all the input TDM signals in each said individual traffic memory.

4. A device as claimed in claim 3, wherein said circuit means are interconnected by a data bus and by a control bus connected to said programmable control means.

5. A radio-relay system for communicating via multichannel TDM signals made up of a sequence of signal bits representing the signals carried by each channel and control bits, the system comprising a plurality of radio stations which are each in communication with at least two other stations and each have a number of user terminals connectable thereto for reception and transmission of signals in respective allocated signal channels processed by that station, each station comprising a respective radio receiver for receiving an incoming TDM signal from each of said at least two other stations, a respective radio transmitter for transmitting a TDM signal to each of said at least two other stations, a TDM switch having a plurality of inputs and outputs, an input being connected to each said receiver and an output being connected to each said transmitter, a multiplexer having a plurality of input ports for connection to user terminals and an output connected to one of the inputs of said TDM switch, and a demultiplexer having a plurality of output ports for connection to user terminals and an input connected to one of said outputs of said TDM switch, said TDM switch including means associated with each said input for accumulating a plurality of input signal bits, a data bus for carrying said plurality of bits in parallel from said accumulating means, and one or a plurality of traffic memories connected to said data bus and to said outputs, said TDM switch being operative to selectively distribute predetermined channels of the input TDM signals to predetermined channels in the output TDM signals, said data bus being capable of carrying bits at a rate greater than the total expected rate of arrival so that accumulated bits can be fed without delay onto said data bus and clock variations in said input TDM signals may be accommodated.

* * * * *